US011121838B2

(12) United States Patent
Sun et al.

(10) Patent No.: US 11,121,838 B2
(45) Date of Patent: Sep. 14, 2021

(54) METHOD, TERMINAL DEVICE, AND NETWORK DEVICE FOR REPORTING PORT INFORMATION

(71) Applicant: Huawei Technologies Co., Ltd., Shenzhen (CN)

(72) Inventors: Yu Sun, Shanghai (CN); Yi Qin, Kista (SE); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 16/674,310

(22) Filed: Nov. 5, 2019

(65) Prior Publication Data

US 2020/0076557 A1    Mar. 5, 2020

Related U.S. Application Data

(63) Continuation of application No. PCT/CN2018/082430, filed on Apr. 10, 2018.

(30) Foreign Application Priority Data

May 5, 2017 (CN) .......................... 201710312706.5

(51) Int. Cl.
H04L 5/00 (2006.01)
H04W 8/24 (2009.01)
H04W 24/10 (2009.01)

(52) U.S. Cl.
CPC ........... *H04L 5/0048* (2013.01); *H04W 24/10* (2013.01); *H04W 8/24* (2013.01)

(58) Field of Classification Search
CPC ............. H04W 56/001; H04W 52/146; H04W 74/006; H04W 28/06; H04W 56/0015;

(Continued)

(56) References Cited

U.S. PATENT DOCUMENTS

2014/0321406 A1   10/2014   Marinier et al.
2016/0323166 A1   11/2016   Pandey et al.
(Continued)

FOREIGN PATENT DOCUMENTS

CN    103891166 A    6/2014
WO    2018027222 A1  2/2018

OTHER PUBLICATIONS

"Discussion on Signaling for PT-RS," 3GPP TSG RAN WG1 Meeting #88bis, Spokane, USA, R1-1705253, pp. 1-10, 3rd Generation Partnership Project, Valbonne, France (Apr. 3-7, 2017).
"PT-RS port association and indication," 3GPP TSG RAN WG1 Meeting #88bis, Spokane,US, R1-1705160, pp. 1-5, 3rd Generation Partnership Project, Valbonne, France (Apr. 3-7, 2017).

(Continued)

*Primary Examiner* — Daniel Lai
(74) *Attorney, Agent, or Firm* — Leydig, Voit & Mayer, Ltd.

(57) ABSTRACT

This application provides a method for reporting port information, a terminal device, and a network device. The method includes: determining, by a terminal device, an uplink signal, where the uplink signal includes information about a phase tracking reference signal (PTRS) port of the terminal device, or the uplink signal includes information about the PTRS port and information about a demodulation reference signal (DMRS) port, or the uplink signal includes a correspondence between the PTRS port and the DMRS port; and sending, by the terminal device, the uplink signal to a network device. In embodiments of this application, the terminal device reports the uplink signal to the network device, so that the network device does not need to configure different PTRS ports for DMRS ports, to avoid configuring excessive PTRS ports, thereby saving PTRS port resources.

20 Claims, 9 Drawing Sheets

(58) Field of Classification Search
CPC ....... H04W 8/24; H04W 28/16; H04W 24/10; H04L 27/2613; H04L 5/0048; H04L 5/0051; H04L 5/0091; H04L 5/0053; H04B 7/0413; H04B 7/0452; H04B 7/024; H04B 7/0473
See application file for complete search history.

(56) References Cited

U.S. PATENT DOCUMENTS

| | | | | |
|---|---|---|---|---|
| 2018/0077603 | A1* | 3/2018 | John Wilson | H04W 72/0406 |
| 2018/0323933 | A1* | 11/2018 | Nam | H04L 5/0051 |
| 2018/0351719 | A1* | 12/2018 | Lee | H04L 1/00 |
| 2020/0052841 | A1* | 2/2020 | Takeda | H04J 13/004 |
| 2020/0213050 | A1* | 7/2020 | Chen | H04L 5/0048 |

OTHER PUBLICATIONS

"3rd Generation Partnership Project; Technical Specification Group Radio Access Network; NR; Radio Resource Control (RRC); Protocol specification (Release 15)," 3GPP TS 38.331 V0.0.2, pp. 1-13, 3rd Generation Partnership Project, Valbonne, France (Mar. 2017).
"On DL PT-RS design," 3GPP TSG RAN WG1 #89, Hangzhou, China, R1-1707976, pp. 1-5, 3rd Generation Partnership Project, Valbonne, France (May 15-19, 2017).
"On the PTRS design for NR," 3GPP TSG RAN WG1 NR Ad-Hoc Meeting, Spokane, USA, R1-1701105, pp. 1-16, 3rd Generation Partnership Project, Valbonne, France (Jan. 16-20, 2017).
"Further details for PT-RS design," 3GPP TSG RAN WG1 Meeting #88b, Spokane, USA, R1-1704240, pp. 1-5, 3rd Generation Partnership Project, Valbonne, France (Apr. 3-7, 2017).

* cited by examiner

METHOD, TERMINAL DEVICE, AND NETWORK DEVICE FOR REPORTING PORT INFORMATION

CROSS-REFERENCE TO RELATED APPLICATIONS

This application is a continuation of International Application No. PCT/CN2018/082430, filed on Apr. 10, 2018, which claims priority to Chinese Patent Application No. 201710312706.5, filed on May 5, 2017. The disclosures of the aforementioned applications are hereby incorporated by reference in their entireties.

TECHNICAL FIELD

This application relates to the communications field, and more specifically, to a method for reporting port information, a terminal device, and a network device in the communications field.

BACKGROUND

With development of mobile Internet technologies, a requirement for a communication rate and capacity is increasing. Existing low frequency spectrum resources are increasingly insufficient, and are difficult to meet a communication requirement. Therefore, high frequency wireless resources with rich spectrum resources become a research hot spot in wireless communication. In a wireless communications system, a frequency device, namely, a local oscillator, is non-ideal. Due to a random jitter of the local oscillator, an output carrier signal has phase noise. A phase noise power changes with 20 log(n) of a carrier frequency, where n is times that the carrier frequency increases. To be specific, every time the carrier frequency is doubled, the phase noise power increases by 6 dB. Therefore, impact of the phase noise cannot be ignored for high frequency wireless communication. A high frequency has been included in a used frequency spectrum range in a new radio (NR) system in the 3rd generation partnership project (3GPP). Therefore, impact related to the phase noise also needs to be considered in a design.

A most frequently used method is to estimate phase noise by using an inserted phase tracking reference signal (PTRS). The phase noise is generated due to non-ideality of a local oscillator. Different local oscillators generate different phase noise. Therefore, if a plurality of data ports for sending data are connected to a same local oscillator, the data sent on the plurality of data ports has same phase noise. Alternatively, if a plurality of data ports are connected to different local oscillators, data sent on the plurality of data ports has different phase noise. During one data transmission, if n local oscillators are connected to data ports for sending data, at least n PTRS ports are required to separately estimate phase noise generated by the n different phase noise sources.

In a prior-art solution, a base station usually configures a quantity of PTRS ports that is the same as a quantity of demodulation reference signal (DMRS) ports. However, NR can support a large quantity of DMRS ports, and orthogonal multiplexing is also applied to the PTRS ports. Consequently, extremely high resource overheads are caused.

SUMMARY

This application provides a method for reporting port information, a terminal device, and a network device, to avoid configuring excessive PTRS ports, thereby reducing resource overheads.

According to a first aspect, a method for reporting port information is provided, and includes:

determining, by a terminal device, an uplink signal, where the uplink signal includes information about a PTRS port of the terminal device, or the uplink signal includes information about the PTRS port and information about a DMRS port, or the uplink signal includes a correspondence between the PTRS port and the DMRS port; and sending, by the terminal device, the uplink signal to a network device.

In this embodiment of this application, the terminal device reports the uplink signal to the network device, and the terminal device can notify the network device of a quantity of PTRS ports required for uplink transmission, so that the network device does not need to configure a corresponding PTRS port for each DMRS port, to avoid configuring excessive PTRS ports, thereby reducing overheads. In particular, resource overheads can be reduced when an orthogonal multiplexing manner is applied to the PTRS port.

Optionally, the uplink signal includes the information about the PTRS port of the terminal device, and the information about the PTRS port is a quantity of PTRS ports.

Alternatively, the information about the PTRS port is a quantity of local oscillators connected to the DMRS port, and a quantity of PTRS ports is equal to the quantity of local oscillators. Specifically, the quantity of PTRS ports may be a maximum quantity of PTRS ports required by the terminal device. Alternatively, the quantity of local oscillators may be a maximum quantity of local oscillators of the terminal device.

Optionally, the uplink signal includes the information about the PTRS port and the information about the DMRS port, the information about the PTRS port is a quantity of PTRS ports, and the information about the DMRS port is a quantity of DMRS ports corresponding to the PTRS port. The uplink signal may further include a maximum quantity of PTRS ports and a maximum quantity of DMRS ports that can be corresponding to each PTRS port.

Optionally, the method further includes: receiving, by the terminal device, the correspondence that is between the PTRS port and the DMRS port and that is sent by the network device, where the correspondence is determined by the network device based on the uplink signal.

Optionally, the method further includes: sending, by the terminal device, a PTRS to the network device, where the PTRS is further used by the network device to update the correspondence between the PTRS port and the DMRS port; and receiving, by the terminal device, the updated correspondence that is between the PTRS port and the DMRS port and that is sent by the network device.

Specifically, the terminal device may send the PTRS and a DMRS to the network device based on the correspondence that is between the PTRS port and the DMRS port and that is sent by the network device or in a default configuration manner in which each DMRS port corresponds to one PTRS port.

Optionally, the uplink signal includes the correspondence between the PTRS port and the DMRS port. One PTRS port herein may correspond to one or more DMRS ports. In addition, a signal on each PTRS port may be used to perform phase estimation on signals on a plurality of DMRS ports corresponding to the PTRS port.

DMRS ports connected to a same local oscillator have same phase noise. A correspondence between the PTRS port and the DMRS ports having the same phase noise is a first-type correspondence. Alternatively, one PTRS port corresponds to one DMRS port, and the DMRS port and the PTRS port that are corresponding to each other have a same equivalent channel or same precoding. A correspondence between the DMRS port and the PTRS port that have the same equivalent channel or the same precoding is referred to as a second-type correspondence. The correspondence that is between the PTRS port and the DMRS port and that is determined by the terminal device may include the first-type correspondence and/or the second-type correspondence.

The one or more DMRS ports herein corresponding to the PTRS port may be referred to as a DMRS port group. In a specific implementation, the terminal device may determine the DMRS ports having the same phase noise as one DMRS port group.

The uplink signal further includes grouping information of the DMRS port of the terminal device, and the correspondence is a correspondence between the PTRS port and the DMRS port group.

Optionally, the grouping information includes a group number of each DMRS port group and a port number of a DMRS port included in each DMRS port group, and the correspondence is a correspondence between the PTRS port and the group number of the DMRS port group.

The correspondence between the PTRS port and the group number of the DMRS port group may be predefined. For example, PTRS ports are in a one-to-one correspondence with group numbers of DMRS port groups in ascending order. Alternatively, the correspondence between the PTRS port and the group number of the DMRS port group may be configured by the terminal device. For example, M0 corresponds to a group number 3, M1 corresponds to a group number 2, and M2 corresponds to a group number 1. The terminal device sends configuration information to the network device by using the uplink signal.

Optionally, before the determining, by a terminal device, an uplink signal, the method further includes:

dividing, by the terminal device, at least two DMRS ports into M DMRS port groups, where each of the M DMRS port groups includes at least one of the DMRS ports, and M is a positive integer.

Optionally, the correspondence is a quasi co-location (QCL) relationship.

Specifically, the terminal device may generate QCL capability assumption information based on the first-type correspondence, in other words, generate QCL capability indication information. The uplink signal includes the QCL capability indication information. Compared with the predefined fixed correspondence, the QCL relationship can be better compatible with the prior art, so that a reference signal resource can be flexibly controlled in a network.

Optionally, the uplink signal is higher layer signaling, uplink control information (UCI), a preamble sequence, a reference signal, an Msg3 signal, or an uplink initial access signal.

The higher layer signaling includes radio resource control (RRC) signaling or a media access control control element (MAC CE), and the higher layer signaling or the UCI is carried on an uplink control channel or an uplink shared channel.

According to a second aspect, a method for reporting port information is provided, and includes:

receiving, by a network device, an uplink signal sent by a terminal device, where the uplink signal includes information about a PTRS port of the terminal device, or the uplink signal includes information about the PTRS port and information about a DMRS port, or the uplink signal includes a correspondence between the PTRS port and the DMRS port.

The network device may configure an uplink PTRS port based on the information included in the uplink signal. When the network device receives different uplink signals, the network device configures the PTRS port in different manners.

In this embodiment of this application, the terminal device reports the uplink signal to the network device, and the terminal device can notify the network device of a quantity of PTRS ports required for uplink transmission, so that the network device does not need to configure a corresponding PTRS port for each DMRS port, to avoid configuring excessive PTRS ports, thereby reducing overheads. In particular, resource overheads can be reduced when an orthogonal multiplexing manner is applied to the PTRS port.

Optionally, the uplink signal includes the information about the PTRS port of the terminal device, and the information about the PTRS port is a quantity of PTRS ports.

In an example, when the quantity of PTRS ports that are in the uplink signal is 1, the network device configures one PTRS port. In this case, a same phase error estimated on the PTRS port is used when DMRSs on a plurality of DMRS ports configured by the network device are used to perform data demodulation.

In another example, when the quantity of PTRS ports that are in the uplink signal is greater than 1, the network device may configure, by default, that the quantity of PTRS ports is equal to a quantity of DMRS ports.

In another example, when the quantity of PTRS ports that are in the uplink signal is 2, the network device may configure two PTRS ports. In this case, if the network device needs to configure six DMRS ports, the network device may configure one PTRS port for three of the six DMRS ports.

Optionally, the uplink signal includes the information about the PTRS port and the information about the DMRS port, the information about the PTRS port is a quantity of PTRS ports, and the information about the DMRS port corresponding to the PTRS port is a quantity of DMRS ports corresponding to the PTRS port.

For example, the network device may configure two PTRS ports when the quantity of PTRS ports that are in the uplink signal is 2, a maximum quantity of DMRS ports that can be corresponding to one PTRS port is 2, and a maximum quantity of DMRS ports that can be corresponding to the other PTRS port is 3.

Optionally, the method further includes: determining, by the network device, the correspondence between the PTRS port and the DMRS port based on the uplink signal.

Specifically, after determining a quantity of PTRS ports required by the terminal device for data transmission, or determining a quantity of PTRS ports required by the terminal device for data transmission and a maximum quantity of DMRS ports that can be corresponding to each PTRS port, the network device may configure the PTRS port and the DMRS port corresponding to the PTRS port, in other words, the network device may determine the correspondence between the PTRS port and the DMRS port based on the uplink signal.

The network device sends the correspondence between the PTRS port and the DMRS port to the terminal device.

Specifically, when the uplink signal includes the quantity of PTRS ports, or the uplink signal includes the quantity of PTRS ports and the quantity of DMRS ports and the quantity of PTRS ports is greater than 1, the network device may further directly configure the correspondence based on the uplink signal, and send the correspondence between the PTRS port and the DMRS port to the terminal device by using a downlink signal. The correspondence herein between the PTRS port and the DMRS port may include a first-type correspondence and/or a second-type correspondence.

It may be understood that when the network device configures, by default, that the quantity of PTRS ports is equal to the quantity of DMRS ports, the network device may not send, to the terminal device, a configuration of the PTRS port and a configuration of the correspondence between the PTRS port and the DMRS port. In this case, the terminal device may consider, by default, that the DMRS port and the PTRS port that are in a one-to-one correspondence with each other are in the first-type correspondence and the second-type correspondence with each other (in other words, meet both the first-type correspondence and the second-type correspondence).

The network device may send a downlink signal to the terminal device. The downlink signal includes the correspondence, and the downlink signal may be higher layer signaling or downlink control information (DCI). The higher layer signaling includes RRC signaling, a MAC CE, or the like. The signaling may be carried on a downlink control channel or a downlink shared channel.

Optionally, the method further includes: receiving, by the network device, a PTRS sent by the terminal device;

updating, by the network device, the correspondence between the PTRS port and the DMRS port based on the PTRS;

after receiving the PTRS sent by the terminal device, measuring, by the network device, phase noise on each uplink PTRS port, where the network device updates a configuration of the PTRS port and a configuration of the correspondence between the PTRS port and the DMRS port by detecting whether phase errors estimated on PTRS ports are the same, and if a phase error detected on a first PTRS port is the same as a phase error detected on a second PTRS, the network device may reduce a quantity of to-be-used PTRS ports; or if the network device detects that the phase errors on the PTRS ports are different, the network device does not need to update the correspondence between the PTRS port and the DMRS port;

and sending, by the network device, the updated correspondence between the PTRS port and the DMRS port to the terminal device.

Optionally, the uplink signal includes the correspondence between the PTRS port and the DMRS port, and the uplink signal further includes grouping information of the DMRS port of the terminal device; and the correspondence is a correspondence between the PTRS port and a DMRS port group.

Optionally, the grouping information includes a group number of each DMRS port group and a port number of a DMRS port included in each DMRS port group, and the correspondence is a correspondence between the PTRS port and the group number of the DMRS port group.

Optionally, the correspondence is a QCL relationship.

The network device may configure, based on QCL capability assumption information, the PTRS port and the DMRS port that are in the first-type correspondence with each other. In addition, the PTRS port and the DMRS port are QCL.

Alternatively, the network device may configure the QCL relationship, and send an indication of the QCL relationship to the terminal device. Specifically, the network device may generate a QCL assumption based on the first-type correspondence, in other words, generate QCL capability indication information, and send the QCL capability indication information to the terminal device. Compared with the predefined fixed correspondence, the QCL relationship can be better compatible with the prior art, so that a reference signal resource can be flexibly controlled in a network.

Optionally, the uplink signal is higher layer signaling, UCI, a preamble sequence, a reference signal, an Msg3 signal, or an uplink initial access signal.

The higher layer signaling includes RRC signaling or a MAC CE, and the higher layer signaling or the UCI is carried on an uplink control channel or an uplink shared channel.

According to a third aspect, an embodiment of this application provides a terminal device, configured to perform the method according to any one of the first aspect or the possible implementations of the first aspect. Specifically, the terminal device includes a module configured to perform the method according to any one of the first aspect or the possible implementations of the first aspect.

According to a fourth aspect, an embodiment of this application provides a network device, configured to perform the method according to any one of the second aspect or the possible implementations of the second aspect. Specifically, the network device includes a module configured to perform the method according to any one of the second aspect or the possible implementations of the second aspect.

According to a fifth aspect, an embodiment of this application provides a terminal device. The terminal device includes a memory, a processor, and a transceiver. The memory is configured to store an instruction, the processor is configured to execute the instruction stored in the memory, and when the processor executes the instruction stored in the memory, the execution enables the processor to perform the method according to any one of the first aspect or the possible implementations of the first aspect.

According to a sixth aspect, an embodiment of this application provides a network device. The network device includes a memory, a processor, and a transceiver. The memory is configured to store an instruction, the processor is configured to execute the instruction stored in the memory, and when the processor executes the instruction stored in the memory, the execution enables the processor to perform the method according to any one of the second aspect or the possible implementations of the second aspect.

According to a seventh aspect, an embodiment of this application provides a computer readable medium, configured to store a computer program. The computer program includes an instruction used to perform the method according to any one of the first aspect or the possible implementations of the first aspect.

According to an eighth aspect, an embodiment of this application provides a computer readable medium, configured to store a computer program. The computer program includes an instruction used to perform the method according to any one of the second aspect or the possible implementations of the second aspect.

According to a ninth aspect, an embodiment of this application provides a communications chip storing an instruction. When running on a terminal device, the instruction enables the communications chip to perform the method according to any one of the first aspect or the possible implementations of the first aspect.

According to a tenth aspect, an embodiment of this application provides a communications chip storing an instruction. When running on a network device, the instruction enables the communications chip to perform the method according to any one of the second aspect or the possible implementations of the second aspect.

DESCRIPTION OF EMBODIMENTS

The following describes technical solutions in this application with reference to the accompanying drawings.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, or the like.

A network device in the embodiments of this application is a network side device that performs wireless communication with the terminal device, for example, a wireless network protocol access point such as a wireless-fidelity (WI-FI) access point, a next-generation communication base station such as a gNB, a small cell, and a micro base station in 5G, and a transmission reception point (TRP), or a relay station, an access point, an in-vehicle device, and a wearable device.

Figure 1:
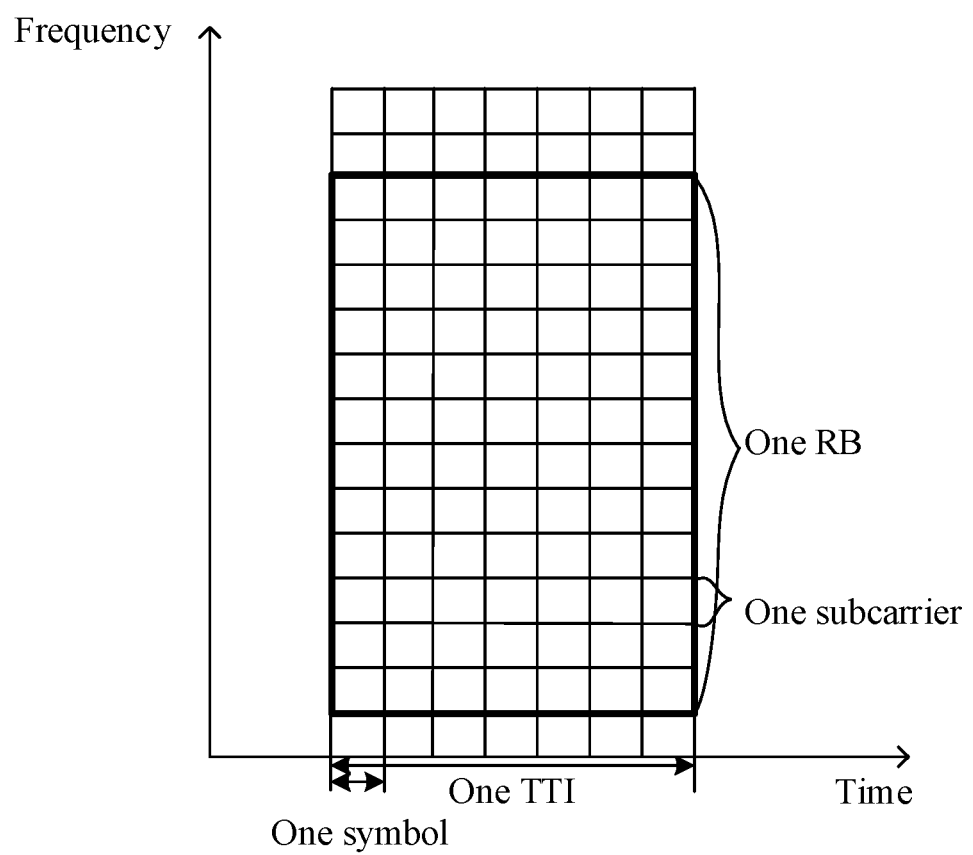
FIG. 1 is a schematic diagram of an air interface resource according to an embodiment of this application.

An air interface resource may be defined as an air interface time domain resource and an air interface frequency domain resource, and is usually represented by a resource element (RE), a resource block (RB), a symbol, a subcarrier, or a transmission time interval (TTI). The air interface resource may be divided in frequency domain and time domain, and is divided into subcarriers in frequency domain and is divided into symbols in time domain. FIG. 1 is a schematic diagram of an air interface resource. The entire air interface resource includes grids divided in frequency domain and time domain. Each grid is one RE, and represents a resource in a subcarrier in a symbol time. Each RE can carry specific information.

A reference signal is a pre-known pilot symbol added by a transmit end to a to-be-sent signal. A receive end completes a specific function based on information about the known pilot symbol. A most frequently used method is to estimate phase noise by using an inserted PTRS.

A multiplexing manner such as FDM, TDM, or CDM is usually used to ensure that pilot signals on a plurality of antenna ports are orthogonal.

Figure 2:
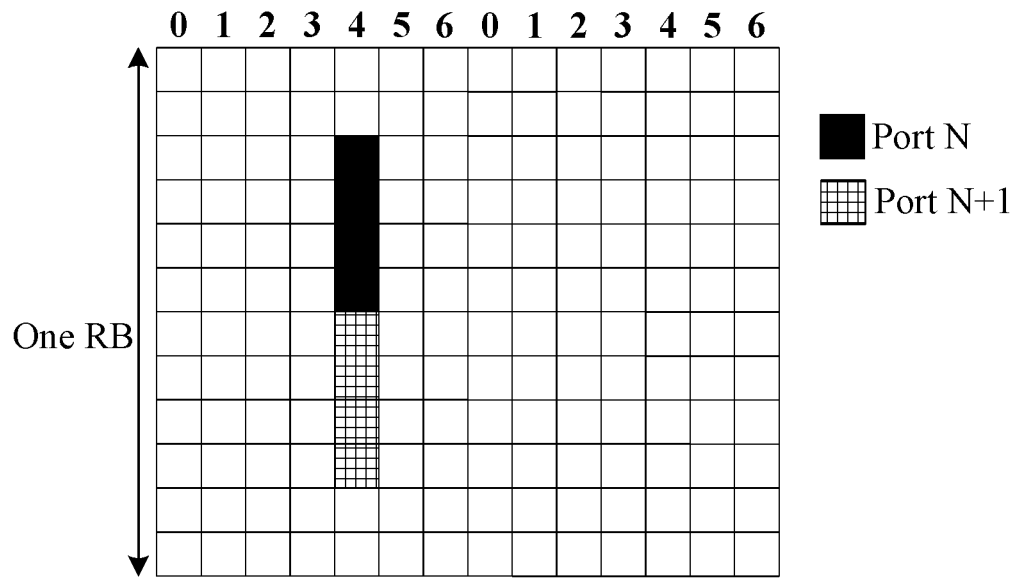
FIG. 2 is a schematic diagram of frequency division multiplexing (FDM) applied to pilot signals on different antenna ports according to an embodiment of this application.
Figure 3:
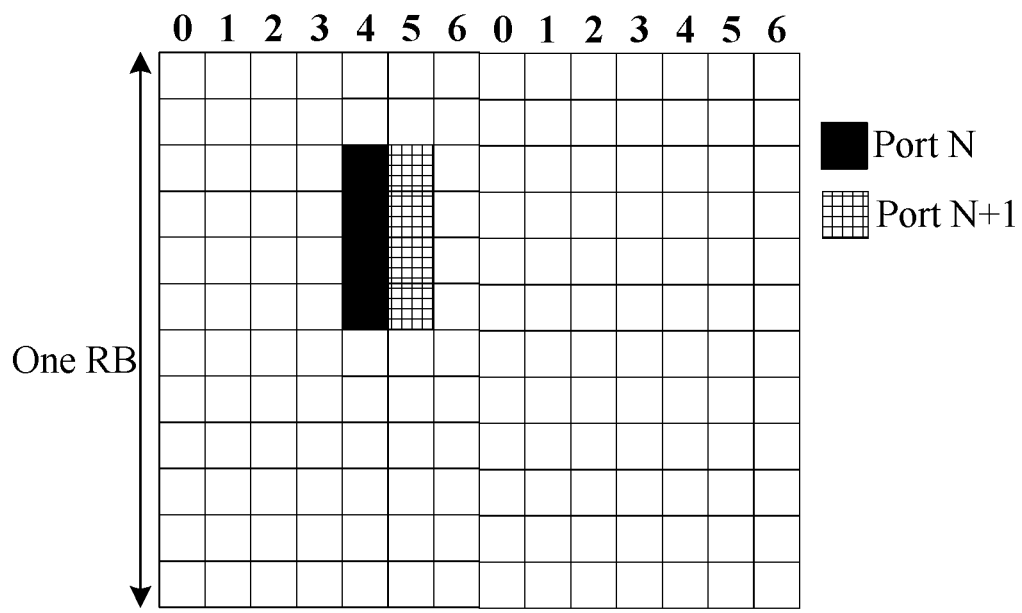
FIG. 3 is a schematic diagram of time division multiplexing (TDM) applied to pilot signals on different antenna ports according to an embodiment of this application.
Figure 4:
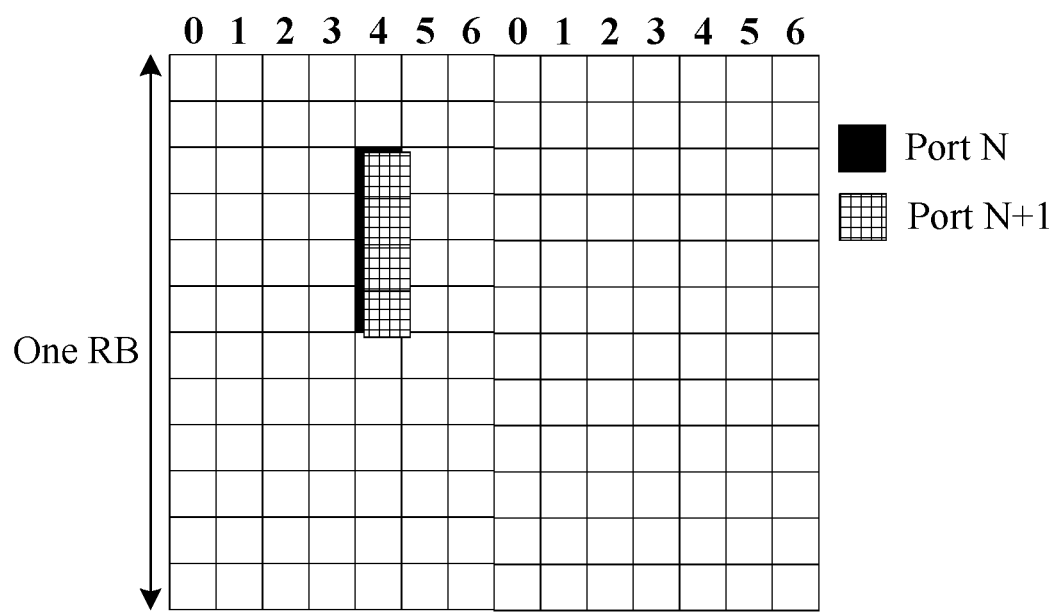
FIG. 4 is a schematic diagram of code division multiplexing (CDM) applied to pilot signals on different antenna ports according to an embodiment of this application.

FIG. 2 is a schematic diagram of FDM applied to pilot signals on different antenna ports. Pilot signals on both a port N and a port N+1 are mapped to a symbol 4, but mapped to different subcarriers in frequency domain. FIG. 3 is a schematic diagram of TDM applied to pilot signals on different antenna ports. Pilot signals on a port N and a port N+1 are mapped to a same subcarrier in frequency domain, a pilot signal on the port N is mapped to a symbol 4 in time domain, and a pilot signal on the port N+1 is mapped to a symbol 5 in time domain. FIG. 4 is a schematic diagram of CDM applied to pilot signals on different antenna ports. Pilot signals on a port N and a port N+1 are mapped to a same time-frequency resource location, and are orthogonal by multiplying one orthogonal code in frequency domain.

Figure 5:
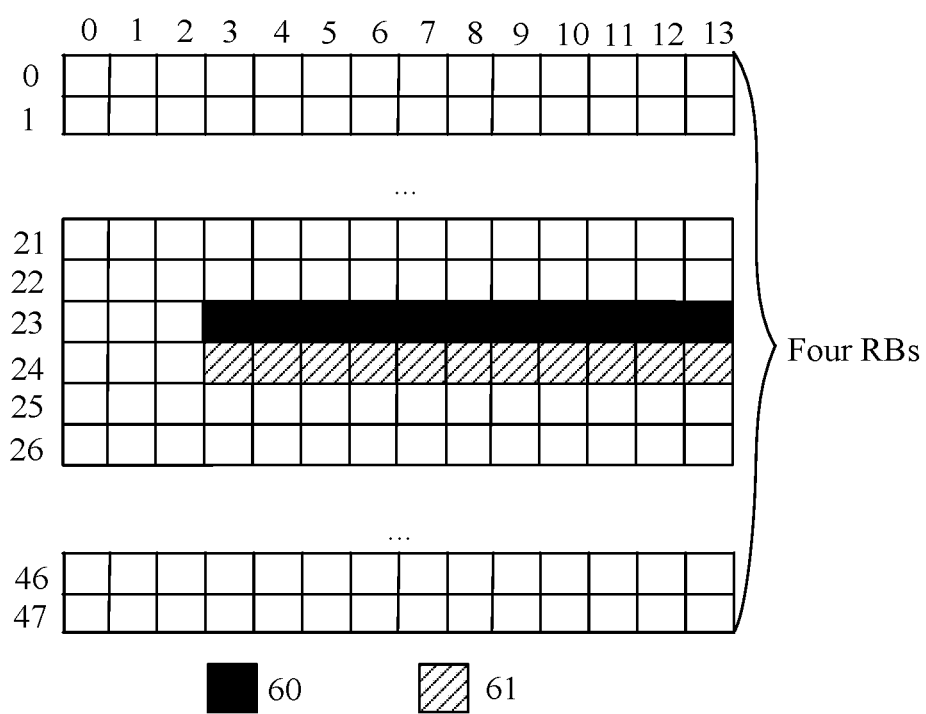
FIG. 5 is a schematic diagram of a phase noise compensation reference signal (PCRS) in networks such as VERIZON 5G.

In a high-frequency protocol in networks such as VERIZON 5G, a PTRS is referred to as a PCRS. The PCRS is introduced in networks such as VERIZON 5G to estimate phase noise. The PCRS is distributed in user scheduling bandwidth. In frequency domain, the PCRS occupies one subcarrier in every four RBs, and in time domain, the PCRS is distributed on each OFDM symbol in a scheduling time range on a physical downlink shared channel (PDSCH). FIG. 5 is a schematic diagram of a PCRS in a network such as VERIZON 5G. There are four-RB resources in total in the figure, and the four-RB resources are separately distributed on symbols 1 to 13 and in subcarriers 0 to 47. Frequency division is performed on PCRSs on antenna ports of different users in a downlink. As shown in FIG. 5, PCRSs on ports 60 and 61 are mapped to a same symbol, but mapped to different subcarriers.

In a solution to a network such as VERIZON 5G, reporting of user equipment is not supported, to be specific, the user equipment does not report usage of a local oscillator at a local end. Therefore, a base station side does not know a specific local oscillator on a user equipment side during one transmission, and cannot accurately configure a PTRS port based on a transmission requirement.

Figure 6:
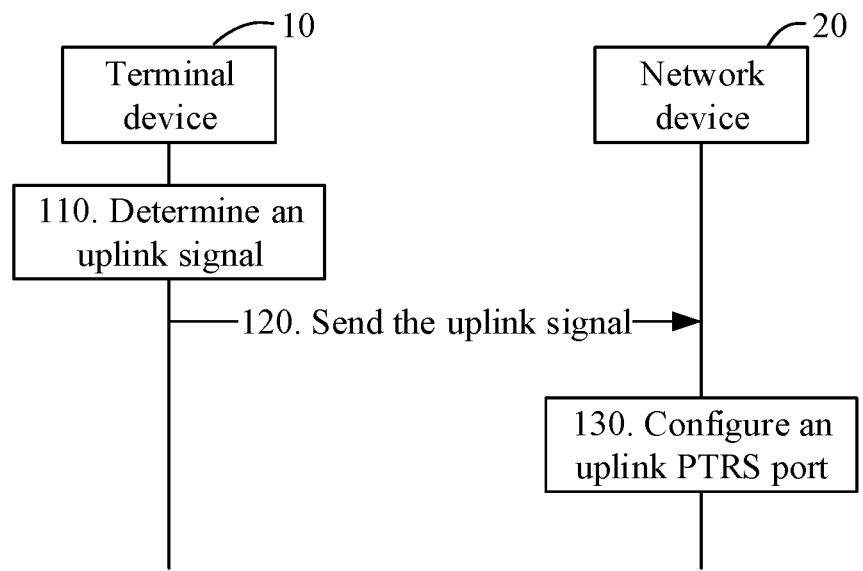
FIG. 6 is a schematic diagram of a method for reporting port information according to an embodiment of this application.

FIG. 6 is a schematic diagram of a method for reporting port information according to an embodiment of this application. It should be understood that FIG. 6 shows steps or operations in the method for reporting port information, but these steps or operations are merely examples. Other operations or transformations of the operations in FIG. 6 may also be performed in this embodiment of this application. In addition, the steps in FIG. 6 may be performed in a sequence that is different from that shown in FIG. 6, and not all the operations in FIG. 6 need to be performed. The method includes the following steps.

110. A terminal device 10 determines an uplink signal.

Specifically, the uplink signal includes information about a PTRS port of the terminal device 10, or the uplink signal includes information about the PTRS port of the terminal device 10 and information about a DMRS port of the terminal device 10, or the uplink signal includes a correspondence between the PTRS port of the terminal device 10 and the DMRS port of the terminal device 10. The PTRS port herein is an uplink PTRS port required by the terminal device 10 to send uplink data.

Phase noise is generated due to non-ideality of a local oscillator. Different local oscillators generate different phase noise. Therefore, if a plurality of data ports for sending data are connected to a same local oscillator, the data sent on the plurality of data ports has same phase noise. Alternatively, if a plurality of data ports are connected to different local oscillators, data sent on the plurality of data ports has different phase noise. During one data transmission, if n local oscillators are connected to data ports for sending data, at least n PTRS ports are required to separately estimate phase noise generated by the n different phase noise sources.

In a possible implementation, when the uplink signal includes the information about the PTRS port of the terminal device 10, the information about the PTRS port may be a quantity of PTRS ports, or the information about the PTRS port is a quantity of local oscillators connected to the DMRS port. In addition, the quantity of PTRS ports is equal to the quantity of local oscillators. Specifically, the quantity of PTRS ports may be a maximum quantity of PTRS ports required by the terminal device 10. Alternatively, the quantity of local oscillators may be a maximum quantity of local oscillators of the terminal device 10.

For example, if three local oscillators of the terminal device are connected to data ports for sending data, a required maximum quantity of PTRS ports is 3. It may be understood that when the terminal device does not need to use all local oscillators to send the data, the quantity of PTRS ports required by the terminal device is less than 3.

Alternatively, in another possible implementation of this application, the uplink signal may include the information about the PTRS port of the terminal device and the information about the DMRS port of the terminal device.

Optionally, the terminal device may report capability indication information to a network device 20. The capability indication information may be the uplink signal. Specifically, the capability indication information may include information indicating whether an antenna board or a transceiver antenna unit shares a same local oscillator and/or a maximum quantity of independent local oscillators of the terminal device. In this embodiment of this application, optionally, the terminal device may further report information indicating whether phase errors estimated on downlink PTRS ports are the same.

Specifically, the uplink signal includes the quantity of PTRS ports and the quantity of DMRS ports corresponding to each PTRS port, or the uplink signal includes a quantity of local oscillators connected to the DMRS port and a quantity of DMRS ports corresponding to each local oscillator. Further, the uplink signal may include a maximum quantity of PTRS ports and a maximum quantity of DMRS ports that can be corresponding to each PTRS port. Each uplink PTRS port herein can correspond to different quantities of DMRS ports. For example, maximum quantities that are of DMRS ports corresponding to three PTRS ports M0, M1, and M2 of the terminal device and that are included in the uplink signal reported by the terminal device to the network device are respectively 3, 3, and 2.

Alternatively, in another possible implementation of this application, the uplink signal may include the correspondence between the PTRS port and the DMRS port that are of the terminal device. One PTRS port herein can correspond to one or more DMRS ports. In addition, a signal on each PTRS port may be used to perform phase estimation on signals on a plurality of DMRS ports corresponding to the PTRS port, in other words, the same PTRS port may be used to perform phase estimation on the signals on the plurality of DMRS ports.

For example, in the uplink signal, M0 corresponds to DMRS ports N0, N1, . . . , and Nm, M1 corresponds to DMRS ports Nm+1, . . . , and Nm+p, and M2 corresponds to DMRS ports Nm+p+1, . . . , and N.

It may be understood that each local oscillator of the terminal device is connected to one or more DMRS ports for sending data. Therefore, DMRS ports connected to a same local oscillator have same phase noise. In addition, the terminal device may further determine, based on a connection relationship between the local oscillator and the antenna board, a port number of a PTRS port corresponding to each DMRS port group. A correspondence herein between the PTRS port and the DMRS ports having the same phase noise may be referred to as a first-type correspondence.

Alternatively, one PTRS port corresponds to one DMRS port, and the DMRS port and the PTRS port that are corresponding to each other have a same equivalent channel or same precoding. A correspondence between the PTRS port and the DMRS port that have the same equivalent channel or the same precoding may be predefined. For example, a PTRS port number is the same as a DMRS port number. Alternatively, a correspondence between the PTRS port and the DMRS port that have the same equivalent channel or the same precoding is configured by the network device. This is not limited in this embodiment of this application. The correspondence herein between the DMRS port and the PTRS port that have the same equivalent channel or the same precoding may be referred to as a second-type correspondence. The DMRS port and the PTRS port that are in the second-type correspondence with each other have the same equivalent channel. It may be understood that channel information estimated by using a DMRS sent on the DMRS port that is in the second-type correspondence with the PTRS port may be used to estimate phase noise on the PTRS port.

In this embodiment of this application, the one or more DMRS ports corresponding to the PTRS port may be referred to as a DMRS port group. In a specific implementation, the terminal device may determine the DMRS ports having the same phase noise as one DMRS port group.

In this way, the uplink signal may further include grouping information of the DMRS port, and a correspondence between the PTRS port and the DMRS port group may be considered as the correspondence between the PTRS port and the DMRS port. Table 1 shows a correspondence that is between a PTRS port and a DMRS port group and that is included in an uplink signal according to an embodiment of this application. The uplink signal includes a quantity, namely, 3, of PTRS ports: M0, M1, and M2, and DMRS port groups corresponding to M0, M0, and M2 are respectively {N0, N1, . . . , Nm}, {Nm+1, . . . , Nm+p}, and {Nm+p+1, . . . , N}.

TABLE 1

| PTRS port | DMRS port group |
| --- | --- |
| M0 | {N0, N1, ..., Nm} |
| M1 | {Nm + 1, ..., Nm + p} |
| M2 | {Nm + p + 1, ..., N} |

Optionally, in this embodiment of this application, the grouping information may specifically include a group number of each DMRS port group and a port number of each DMRS port. Table 2 shows grouping information included in an uplink signal according to an embodiment of this application. Port numbers of DMRS ports included in DMRS port groups with group numbers of 0, 1, and 2 are respectively {N0, N1, ..., Nm}, {Nm+1, ..., Nm+p}, and {Nm+1, ..., N}. In this case, the correspondence between the PTRS port and the DMRS port may be a correspondence between the PTRS port and the group number of the DMRS port group.

TABLE 2

| Group number of a DMRS port group | Port number of a DMRS port |
| --- | --- |
| 0 | {N0, N1, ..., Nm} |
| 1 | {Nm + 1, ..., Nm + p} |
| 2 | {Nm + p + 1, ..., N} |

The correspondence between the PTRS port and the group number of the DMRS port group may be predefined. For example, PTRS ports are in a one-to-one correspondence with group numbers of DMRS port groups in ascending order. To be specific, if the PTRS ports are M0, M0, and M2 in ascending order, a group number of a DMRS port group corresponding to the port M0 is 0, a group number of a DMRS port group corresponding to the port M1 is 1, and a group number of a DMRS port group corresponding to M2 is 2. It should be noted that the foregoing predefined manner is merely an example, and this predefined manner is not limited in this embodiment of this application.

The correspondence between the PTRS port and the group number of the DMRS port group may alternatively be configured by the terminal device. For example, M0 corresponds to a group number 3, M1 corresponds to a group number 2, and M2 corresponds to a group number 1. The terminal device sends configuration information to the network device by using the uplink signal. The uplink signal may be higher layer signaling, including RRC signaling, a MAC CE, or the like.

In this embodiment of this application, the correspondence that is between the PTRS port and the DMRS port and that is determined by the terminal device may include the first-type correspondence and/or the second-type correspondence. For example, if the correspondence determined by the terminal device includes only the first-type correspondence, the terminal device may send a correspondence shown in Table 3 to the network device. In this case, the second-type correspondence may be predefined. For example, a DMRS port that has a smallest port number and that is in a DMRS port group corresponding to the PTRS port is in the second-type correspondence with the PTRS port. Alternatively, a DMRS port that has a largest port number and that is in a DMRS port group corresponding to the PTRS port is in the second-type correspondence with the PTRS port.

TABLE 3

| PTRS port | DMRS port in a first-type correspondence |
| --- | --- |
| M0 | {N0, N1, ..., Nm} |
| M1 | {Nm + 1, ..., Nm + p} |
| M2 | {Nm + p + 1, ..., N} |

For another example, if the correspondence determined by the terminal device includes the first-type correspondence and the second-type correspondence, the terminal device may send a correspondence shown in FIG. 4 to the network device. In this case, it may be understood that the second-type correspondence is configured by the terminal device.

TABLE 4

| PTRS port | DMRS port in a first-type correspondence | DMRS port in a second-type correspondence |
| --- | --- | --- |
| M0 | {N0, N1, ..., Nm} | N1 |
| M1 | {Nm + 1, ..., Nm + p} | Nm + 1 |
| M2 | {Nm + p + 1, ..., N} | Nm + p + 2 |

Optionally, before the terminal device determines the uplink signal, the terminal device may further divide at least two DMRS ports into M DMRS port groups, where each of the M DMRS port groups includes at least one of the DMRS ports, and M is a positive integer.

In some possible implementations, the first-type correspondence may be further a QCL relationship. Specifically, the terminal device may generate a QCL assumption based on the first-type correspondence, in other words, generate QCL capability assumption information. Alternatively, the QCL capability assumption information is referred to as QCL capability indication information. The uplink signal in step 110 includes the QCL capability indication information. Compared with the predefined fixed correspondence, the QCL relationship can be better compatible with the prior art, so that a reference signal resource can be flexibly controlled in a network.

120. The terminal device 10 sends the uplink signal to a network device 20.

Specifically, the uplink signal may be higher layer signaling or UCI. The higher layer signaling includes RRC signaling or a MAC CE. The signaling may be carried on an uplink control channel or an uplink shared channel. Alternatively, the uplink signal may be transmitted by using a preamble sequence, a reference signal, or an Msg3 signal.

130. The network device 20 configures an uplink PTRS port based on the uplink signal.

The network device may configure the uplink PTRS port based on information included in the uplink signal. In other words, when the network device receives different uplink signals, the network device configures the PTRS port in different manners.

In an example, when a quantity of PTRS ports that are in the uplink signal is 1, the network device configures one PTRS port. In this case, a same phase error estimated on the PTRS port is used when DMRSs on a plurality of DMRS ports configured by the network device are used to perform data demodulation.

In another example, when a quantity of PTRS ports that are in the uplink signal is greater than 1. For example, when the quantity of PTRS ports that are in the uplink signal is 2, the network device may configure, by default, that the quantity of PTRS ports is equal to a quantity of DMRS ports. In this case, the PTRS port and the DMRS port that are configured by the network device have a same port number or are in a predefined one-to-one correspondence with each other. For example, the network device may configure one corresponding PTRS port for each of six DMRS ports. Specifically, a DMRS port N0 may correspond to a PTRS port M0, a DMRS port N1 may correspond to a PTRS port M1, . . . , and a DMRS port N5 may correspond to a PTRS port M5. The PTRS port and the DMRS port that are in the one-to-one correspondence with each other may be in both a first-type correspondence and a second-type correspondence with each other.

Alternatively, when a quantity of PTRS ports that are in the uplink signal is 2, the network device may configure two PTRS ports. In this case, if the network device needs to configure six DMRS ports, the network device may configure one PTRS port for three of the six DMRS ports. For example, the network device may jointly configure one PTRS port M0 for DMRS ports N0, N1, and N2, and jointly configure one PTRS port M1 for DMRS ports N3, N4, and N5.

Alternatively, the network device may configure two PTRS ports when a quantity of PTRS ports that are in the uplink signal is 2, a maximum quantity of DMRS ports that can be corresponding to one PTRS port is 2, and a maximum quantity of DMRS ports that can be corresponding to the other PTRS port is 3. Specifically, the network device may configure DMRS ports corresponding to a PTRS port M0 as N0 and N1, and configure DMRS ports corresponding to a PTRS port M1 as N2, N3, and N4.

In other words, after determining a quantity of PTRS ports required by the terminal device for data transmission, or determining a quantity of PTRS ports required by the terminal device for data transmission and a maximum quantity of DMRS ports that can be corresponding to each PTRS port, the network device may configure the PTRS port and the DMRS port corresponding to the PTRS port, in other words, the network device may determine the correspondence between the PTRS port and the DMRS port.

It may be understood that the correspondence herein between the PTRS port and the DMRS port includes information about each PTRS port configured by the network device and information about a DMRS port corresponding to each PTRS port. In other words, that the network device determines the correspondence between the PTRS port and the DMRS port may mean that the network device determines configuration information of the PTRS port and the correspondence between the PTRS port and the DMRS port.

In this embodiment of this application, when the uplink signal includes the quantity of PTRS ports, or the uplink signal includes the quantity of PTRS ports and the quantity of DMRS ports and the quantity of PTRS ports is greater than 1, the network device may further directly configure the correspondence based on the uplink signal, and send the correspondence between the PTRS port and the DMRS port to the terminal device by using a downlink signal. The correspondence herein between the PTRS port and the DMRS port may include the first-type correspondence and/or the second-type correspondence.

It may be understood that when the network device configures, by default, that the quantity of PTRS ports is equal to the quantity of DMRS ports, the network device may not send, to the terminal device, a configuration of the PTRS port and a configuration of the correspondence between the PTRS port and the DMRS port. In this case, the terminal device may consider, by default, that the DMRS port and the PTRS port that are in a one-to-one correspondence with each other are in the first-type correspondence and the second-type correspondence with each other (in other words, meet both the first-type correspondence and the second-type correspondence).

The terminal device may send a PTRS and a DMRS to the network device based on the configuration that is of the PTRS port and that is sent by the network device and the correspondence that is between the PTRS port and the DMRS port and that is sent by the network device or in a default configuration manner in which each DMRS port corresponds to one PTRS port. In this embodiment of this application, the network device may perform phase noise estimation, channel estimation, frequency offset estimation, or Doppler shift estimation based on the PTRS. This is not limited in this embodiment of this application.

For example, the terminal device may send a first PTRS through a PTRS port M0, and send a second PTRS through a PTRS port M1. In addition, the PTRS port M0 corresponds to DMRS ports N0 and N1, and the PTRS port M1 corresponds to DMRS ports N2, N3, and N4.

After receiving the PTRS sent by the terminal device, the network device may measure phase noise on each uplink PTRS port. The network device updates a configuration of the PTRS port and a configuration of the correspondence between the PTRS port and the DMRS port by detecting whether phase errors estimated on PTRS ports are the same. The network device may send the updated configuration of the correspondence to the terminal device by using a downlink signal.

Specifically, if a phase error detected on a first PTRS port is the same as a phase error detected on a second PTRS port, the network device may reduce a quantity of to-be-used PTRS ports. For example, the network device may not use a PTRS port M1, and update DMRS ports corresponding to a PTRS port M0 to N0, N1, N2, N3, and N4. In other words, if the network device detects that N PTRS ports have same phase noise, the network device may configure, based on a measurement value, only one or more of the N PTRS ports to perform uplink transmission.

It may be understood that when detecting that the phase errors on the PTRS ports are different, the network device does not need to update the correspondence between the PTRS port and the DMRS port.

Specifically, the downlink signal may be higher layer signaling or DCI. The higher layer signaling includes RRC signaling, a MAC CE, or the like. The signaling may be carried on a downlink control channel or a downlink shared channel.

The correspondence herein that is between the PTRS port and the DMRS port and that is sent by the network device to the terminal device may include the first-type correspondence and/or the second-type correspondence. In addition, the network device may send the correspondence to the terminal device. For example, the network device may send the correspondence shown in Table 1, Table 2, Table 3, or Table 4 to the terminal device.

In addition, after the network device updates the correspondence between the PTRS port and the DMRS port, the network device sends the updated correspondence to the terminal device, so that the terminal device performs uplink data transmission based on the updated port configuration.

In another example, when the uplink signal includes the correspondence between the PTRS port and the DMRS port, the network device may configure, based on the correspondence, the PTRS port and the DMRS port corresponding to the PTRS port. When the PTRS port corresponds to one DMRS port group in the uplink signal, the network device considers that uplink DMRS ports in a same DMRS port group have same phase noise, and therefore may configure one PTRS port for the DMRS ports in the same DMRS port group.

For example, in the uplink signal, when a PTRS port M0 corresponds to DMRS ports N0, N1, and N2, and a PTRS port M1 corresponds to DMRS ports N3, N4, and N5, the network device may directly configure the PTRS port and the DMRS port.

In this embodiment of this application, the correspondence may be a QCL relationship. The network device may configure, based on QCL capability assumption information sent by the terminal device, the PTRS port and the DMRS port that are in the first-type correspondence with each other. In addition, the PTRS port and the DMRS port are QCL.

Alternatively, the network device may configure the QCL relationship based on the uplink signal sent by the terminal device, and send an indication of the QCL relationship to the terminal device. Specifically, the network device may generate a QCL assumption based on the first-type correspondence, in other words, generate QCL capability indication information, and send the QCL capability indication information to the terminal device. Compared with the predefined fixed correspondence, the QCL relationship can be better compatible with the prior art, so that a reference signal resource can be flexibly controlled in a network.

Therefore, in this embodiment of this application, the terminal device reports the uplink signal to the network device, and the terminal device can notify the network device of a quantity of PTRS ports required for uplink transmission, so that the network device does not need to configure a corresponding PTRS port for each DMRS port, to avoid configuring excessive PTRS ports, thereby reducing overheads. In particular, resource overheads can be reduced when an orthogonal multiplexing manner is applied to the PTRS port.

Due to a physical characteristic of phase noise, a characteristic that the phase noise randomly changes in terms of time usually needs to be considered in a design of a PTRS. Because a coherence time is relatively short, a reference signal for estimating the phase noise usually requires a relatively high time domain density, and different transmission conditions also have different requirements for a time domain density of the PTRS.

Figure 7:
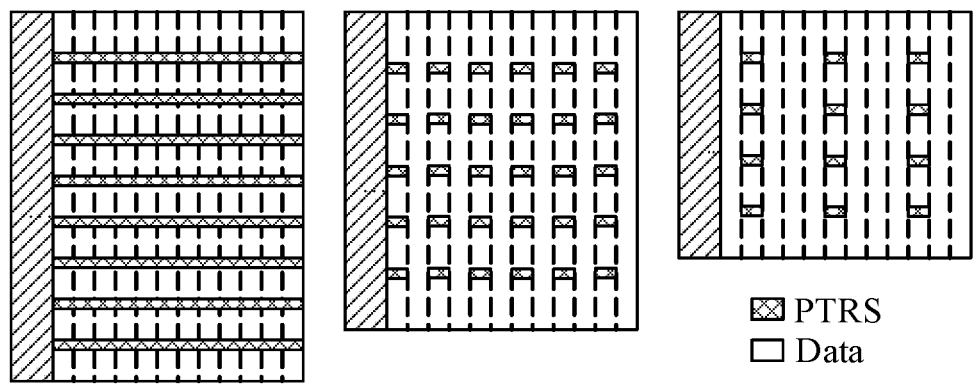
FIG. 7 is a schematic diagram of a time-frequency domain density of a PTRS according to an embodiment of this application.

In an embodiment of this application, an orthogonal multiplexing manner of a PTRS port may be determined based on a configuration of a time-frequency pattern of a PTRS. FIG. 7 is a schematic diagram of a time-frequency domain density of a PTRS according to an embodiment of this application. In FIG. 7, frequency domain patterns are evenly and discretely distributed in scheduling bandwidth. In FIG. 7, a PTRS (having a density of 1) is sent on each OFDM symbol in a left figure, a PTRS (having a density of ½) is sent on one of every two OFDM symbols in a middle figure, and a PTRS (having a density of ¼) is sent on one of every four OFDM symbols in a right figure.

Figure 8:
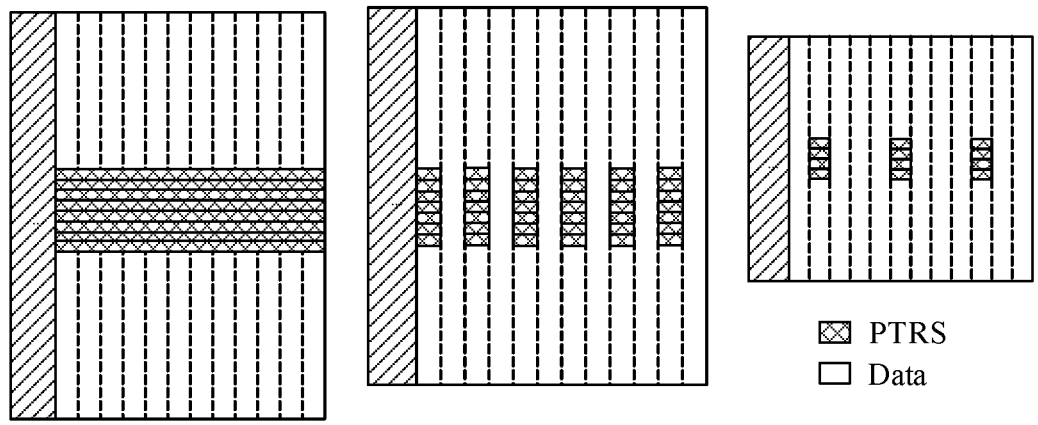
FIG. 8 is a schematic diagram of a time-frequency domain density of another PTRS according to an embodiment of this application.

FIG. 8 is a schematic diagram of a time-frequency domain density of another PTRS according to an embodiment of this application. In FIG. 8, frequency domain patterns are centrally distributed in a plurality of consecutive subcarriers in scheduling bandwidth. Similarly, in FIG. 8, a PTRS (having a density of 1) is sent on each OFDM symbol in a left figure, a PTRS (having a density of ½) is sent on one of every two OFDM symbols in a middle figure, and a PTRS (having a density of ¼) is sent on one of every four OFDM symbols in a right figure.

In this embodiment of this application, a relationship between the orthogonal multiplexing manner of the PTRS port and the time-frequency pattern may be predefined. In other words, the orthogonal multiplexing manner of the PTRS port has the predefined relationship with the time-frequency pattern.

In an example, when time-frequency patterns of PTRSs are centrally distributed in frequency domain, a CDM manner is applied to the PTRS port, and a code may be an orthogonal sequence, a pseudo orthogonal sequence, or a cyclic shift. Specifically, the PTRSs may be centrally distributed in N consecutive subcarriers in frequency domain, and PTRSs on M ports are distributed on a same time-frequency resource (M≤N). PTRSs on different ports can be orthogonal by multiplying an orthogonal covering code (OCC) in frequency domain. It should be noted that this example is merely intended to make a person skilled in the art better understand this technical solution, and the solution is not limited to the example.

Figure 9:
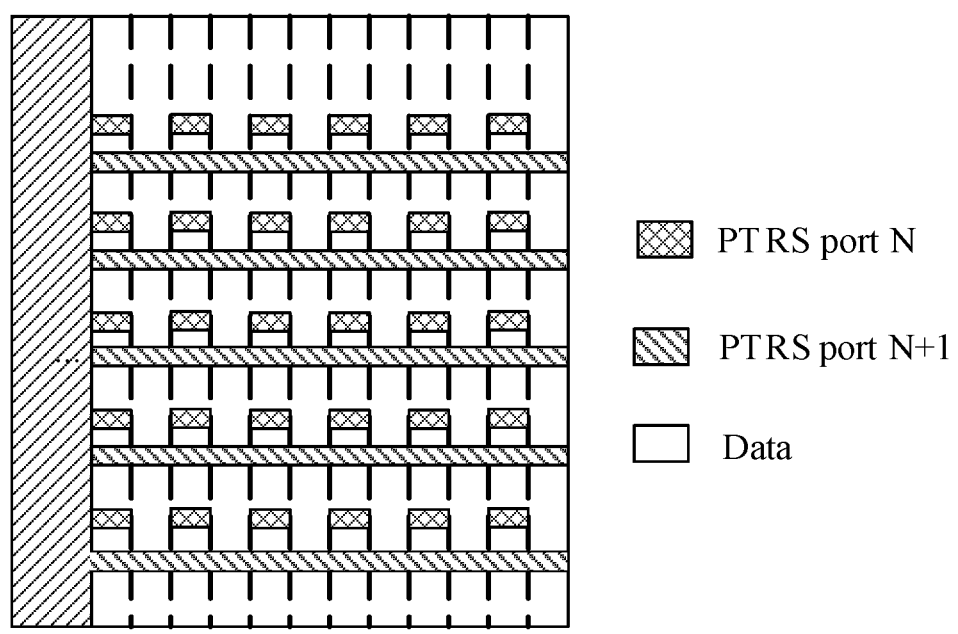
FIG. 9 is a schematic diagram of orthogonal frequency division multiplexing (OFDM) applied to a PTRS port according to an embodiment of this application.

In another example, when time-frequency patterns of PTRSs are discretely distributed in frequency domain, an FDM manner may be applied to the PTRS port, in other words, PTRSs on different ports are mapped to different subcarrier locations in frequency domain. The PTRSs on the different ports may have different time domain densities. FIG. 9 is a schematic diagram of OFDM applied to a PTRS port according to an embodiment of this application. PTRSs on a port N and a port N+1 are mapped to different subcarriers in frequency domain, a PTRS on the port N has a time domain density of ½, and a PTRS on the port N+1 has a time domain density of 1.

Figure 10:
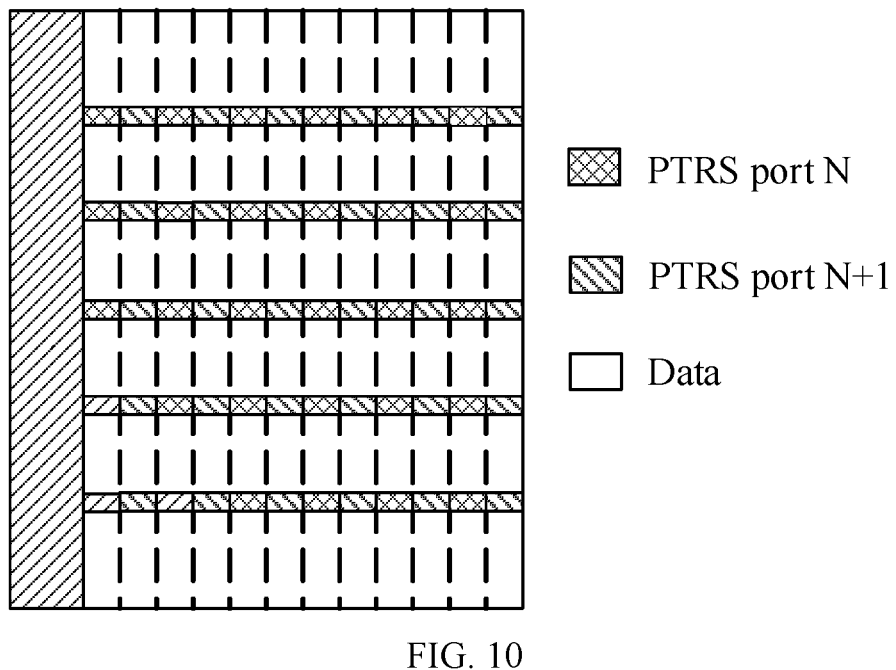
FIG. 10 is a schematic diagram of TDM applied to a PTRS port according to an embodiment of this application.

In another example, when time-frequency patterns of PTRSs are discrete in frequency domain and a time domain density is less than 1, a TDM manner and/or an FDM manner may be applied to the PTRS port. For example, a PTRS sent on a PTRS port N has a time domain density of ½, and a PTRS sent on a PTRS port N+1 has a time domain density of ½. An orthogonal time division multiplexing (OTDM) manner is applied to reference signals sent on the PTRS port N and the PTRS port N+1. FIG. 10 is a schematic diagram of TDM applied to a PTRS port according to an embodiment of this application. In FIG. 10, PTRSs on a port N and a port N+1 are mapped to a same subcarrier in frequency domain, and PTRSs on the port N and the port N+1 are mapped to different symbols in time domain.

Figure 11:
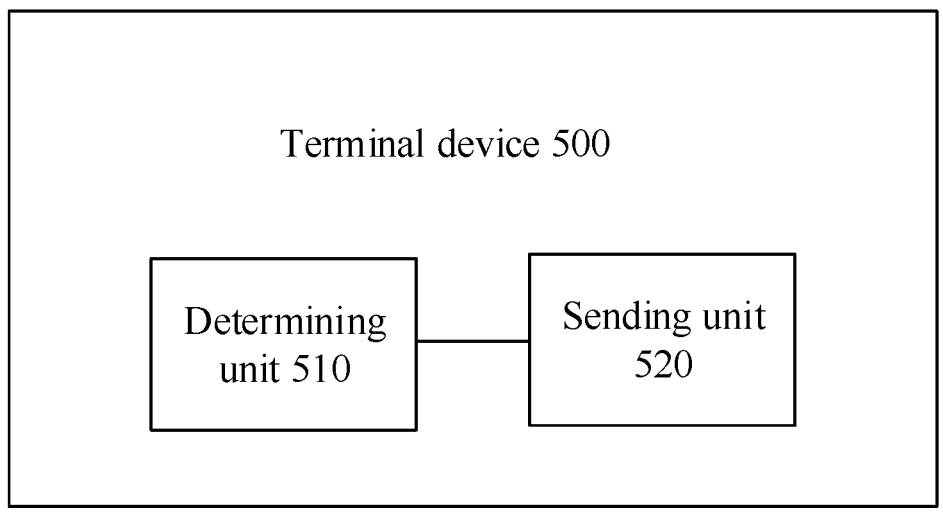
FIG. 11 is a schematic block diagram of a terminal device according to an embodiment of this application.

FIG. 11 is a schematic block diagram of a terminal device 500 according to an embodiment of this application. The terminal device 500 includes:

a determining unit 510, configured to determine an uplink signal, where the uplink signal includes information about a PTRS port of the terminal device 500, or the uplink signal includes information about the PTRS port and information about a DMRS port, or the uplink signal includes a correspondence between the PTRS port and the DMRS port; and a sending unit 520, configured to send the uplink signal to a network device.

Therefore, in this embodiment of this application, the terminal device 500 reports the uplink signal to the network device, and the terminal device 500 can notify the network device of a quantity of PTRS ports required for uplink transmission, so that the network device does not need to configure a corresponding PTRS port for each DMRS port, to avoid configuring excessive PTRS ports, thereby reducing overheads. In particular, resource overheads can be reduced when an orthogonal multiplexing is applied to the PTRS port.

Optionally, the uplink signal includes the information about the PTRS port of the terminal device 500, and the information about the PTRS port is a quantity of PTRS ports.

Optionally, the uplink signal includes the information about the PTRS port and the information about the DMRS port, the information about the PTRS port is a quantity of PTRS ports, and the information about the DMRS port is a quantity of DMRS ports corresponding to the PTRS port.

Optionally, the terminal device 500 further includes a receiving unit, configured to receive, by the terminal device, the correspondence that is between the PTRS port and the DMRS port and that is sent by the network device, where the correspondence is determined by the network device based on the uplink signal.

Optionally, the sending unit 502 is further configured to send a PTRS to the network device, where the PTRS is further used by the network device to update the correspondence between the PTRS port and the DMRS port.

The terminal device receives the updated correspondence that is between the PTRS port and the DMRS port and that is sent by the network device.

Optionally, the uplink signal includes the correspondence between the PTRS port and the DMRS port, and the uplink signal further includes grouping information of the DMRS port of the terminal device; and the correspondence is a correspondence between the PTRS port and a DMRS port group.

Optionally, the grouping information includes a group number of each DMRS port group and a port number of a DMRS port included in each DMRS port group, and the correspondence is a correspondence between the PTRS port and the group number of the DMRS port group.

Optionally, the terminal device 500 further includes a group division unit, configured to divide, by the terminal device, at least two DMRS ports into M DMRS port groups, where each of the M DMRS port groups includes at least one of the DMRS ports.

Optionally, the correspondence is a QCL relationship.

Optionally, the uplink signal is higher layer signaling, UCI, a preamble sequence, a reference signal, an Msg3 signal, or an uplink initial access signal. The higher layer signaling includes RRC signaling or a MAC CE, and the higher layer signaling or the UCI is carried on an uplink control channel or an uplink shared channel.

Figure 12:
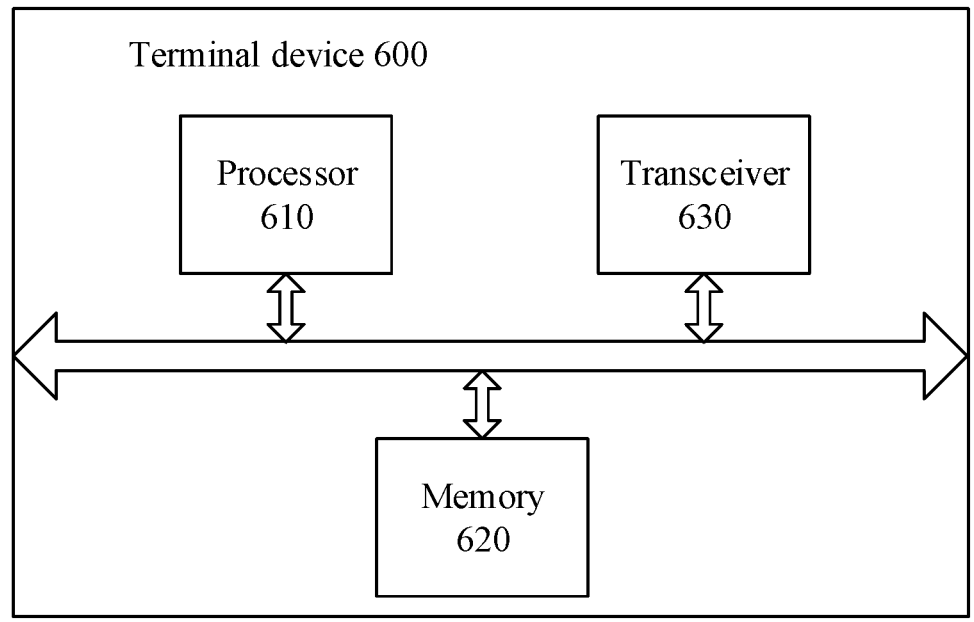
FIG. 12 is a schematic block diagram of another terminal device according to an embodiment of this application.

It should be noted that in this embodiment of this application, the determining unit 510 may be implemented by a processor, and the sending unit 520 may be implemented by a transceiver. As shown in FIG. 12, a terminal device 600 may include a processor 610, a memory 620, and a transceiver 630. The memory 620 may be configured to store code executed by the processor 610, or the like. It should be understood that the transceiver 630 may include a transmitter and a receiver. The transceiver 630 may further include an antenna, and there may be one or more antennas. The memory 620 may be a separate device, or may be integrated into the processor 610. All or some of the foregoing devices may be integrated into a chip for implementation, for example, integrated into a baseband chip for implementation.

The network device or the terminal device in the apparatus embodiment is fully corresponding to the network device or the terminal device in the method embodiment, and a corresponding module performs a corresponding step. For example, a sending module or a transmitter performs the sending step in the method embodiment, a receiving module or a receiver performs the receiving step in the method embodiment, and a step other than the sending step and the receiving step may be performed by a processing module or a processor. For a function of a specific module, refer to a corresponding method embodiment. Details are not described again.

In an implementation process, steps in the foregoing method can be implemented by using a hardware integrated logic circuit in the processor 610 or by using an instruction in a form of software. The steps in the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 620, and the processor 610 reads information from the memory 620 and completes the steps in the foregoing method in combination with hardware in the processor 610. To avoid repetition, details are not described herein again.

The terminal device 500 shown in FIG. 11 or the terminal device 600 shown in FIG. 12 can implement each process corresponding to the method embodiment shown in FIG. 6. Specifically, for the terminal device 500 or the terminal device 600, refer to the descriptions in FIG. 6. To avoid repetition, details are not described herein again.

An embodiment of this application provides a computer readable medium, configured to store a computer program. The computer program includes an instruction used to perform the method corresponding to the terminal device in various implementations in FIG. 6.

An embodiment of this application further provides a communications chip storing an instruction. When running on the terminal device 500 or the terminal device 600, the instruction enables the communications chip to perform the method corresponding to the terminal device in various implementations in FIG. 6.

Figure 13:
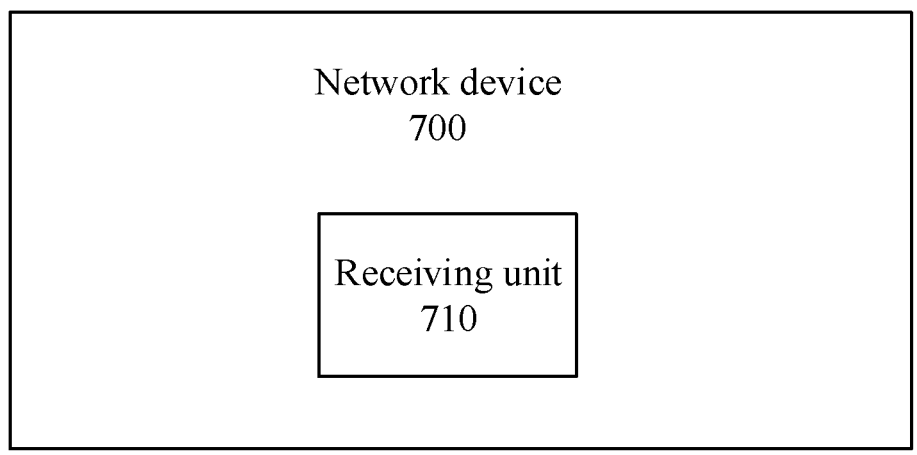
FIG. 13 is a schematic block diagram of a network device according to an embodiment of this application.

FIG. 13 is a schematic block diagram of a network device 700 according to an embodiment of this application. The network device 700 includes:

a receiving unit 710, configured to receive an uplink signal sent by a terminal device, where the uplink signal includes information about a PTRS port of the terminal device, or the uplink signal includes information about the PTRS port and information about a DMRS port, or the uplink signal includes a correspondence between the PTRS port and the DMRS port.

Therefore, in this embodiment of this application, the terminal device reports the uplink signal to the network device 700, and the terminal device can notify the network device 700 of a quantity of PTRS ports required for uplink transmission, so that the network device 700 does not need to configure a corresponding PTRS port for each DMRS port, to avoid configuring excessive PTRS ports, thereby reducing overheads. In particular, resource overheads can be reduced when an orthogonal multiplexing is applied to the PTRS port.

Optionally, the uplink signal includes the information about the PTRS port of the terminal device, and the information about the PTRS port is a quantity of PTRS ports.

Optionally, the uplink signal includes the information about the PTRS port and the information about the DMRS port, the information about the PTRS port is a quantity of PTRS ports, and the information about the DMRS port corresponding to the PTRS port is a quantity of DMRS ports corresponding to the PTRS port.

Optionally, the network device 700 further includes a determining unit, configured to determine the correspondence between the PTRS port and the DMRS port based on the uplink signal.

The network device 700 further includes a sending unit, configured to send the correspondence between the PTRS port and the DMRS port to the terminal device.

Optionally, the receiving unit 710 is further configured to receive a PTRS sent by the terminal device. The determining unit is further configured to update the correspondence between the PTRS port and the DMRS port based on the PTRS. The sending unit is further configured to send the updated correspondence between the PTRS port and the DMRS port to the terminal device.

Optionally, the uplink signal includes the correspondence between the PTRS port and the DMRS port, and the uplink signal further includes grouping information of the DMRS port of the terminal device; and the correspondence is a correspondence between the PTRS port and a DMRS port group.

Optionally, the grouping information includes a group number of each DMRS port group and a port number of a DMRS port included in each DMRS port group, and the correspondence is a correspondence between the PTRS port and the group number of the DMRS port group.

Optionally, the correspondence is a QCL relationship.

Optionally, the uplink signal is higher layer signaling, UCI, a preamble sequence, a reference signal, an Msg3 signal, or an uplink initial access signal. The higher layer signaling includes RRC signaling or a MAC CE, and the higher layer signaling or the UCI is carried on an uplink control channel or an uplink shared channel.

Figure 14:
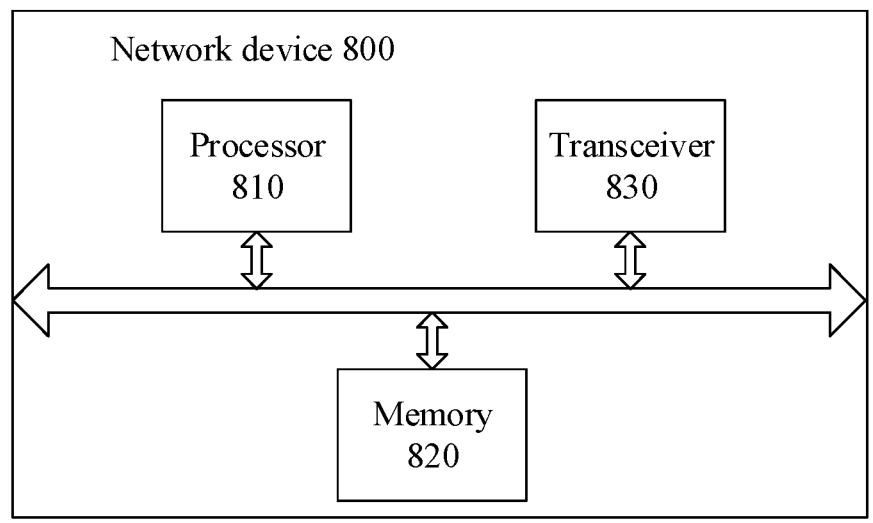
FIG. 14 is a schematic block diagram of another network device according to an embodiment of this application.

It should be noted that in this embodiment of this application, the receiving unit 710 and the sending unit may be implemented by a transceiver, and the determining unit may be implemented by a processor. As shown in FIG. 14, a network device 800 may include a processor 810, a memory 820, and a transceiver 830. The memory 820 may be configured to store code executed by the processor 810, or the like. It should be understood that the transceiver 830 may include a transmitter and a receiver. The transceiver 830 may further include an antenna, and there may be one or more antennas. The memory 820 may be a separate device, or may be integrated into the processor 810. All or some of the foregoing devices may be integrated into a chip for implementation, for example, integrated into a baseband chip for implementation.

The network device or the terminal device in the apparatus embodiment is fully corresponding to the network device or the terminal device in the method embodiment, and a corresponding module performs a corresponding step. For example, a sending module or a transmitter performs the sending step in the method embodiment, a receiving module or a receiver performs the receiving step in the method embodiment, and a step other than the sending step and the receiving step may be performed by a processing module or a processor. For a function of a specific module, refer to a corresponding method embodiment. Details are not described again.

In an implementation process, steps in the foregoing method can be implemented by using a hardware integrated logic circuit in the processor 810 or by using an instruction in a form of software. The steps in the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 820, and the processor 810 reads information from the memory 820 and completes the steps in the foregoing method in combination with hardware in the processor 810. To avoid repetition, details are not described herein again.

The network device 700 shown in FIG. 13 or the network device 800 shown in FIG. 14 can implement each process corresponding to the method embodiment shown in FIG. 6. Specifically, for the network device 700 or the network device 800, refer to the descriptions in FIG. 6. To avoid repetition, details are not described herein again.

An embodiment of this application provides a computer readable medium, configured to store a computer program. The computer program includes an instruction used to perform the method corresponding to the network device in various implementations in FIG. 6.

An embodiment of this application further provides a communications chip storing an instruction. When running on the network device 700 or the network device 800, the instruction enables the communications chip to perform the method corresponding to the network device in various implementations in FIG. 6.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, with reference to the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the foregoing described apparatus embodiment is merely an example. For example, the unit division is merely logical function division. There may be another division manner during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When being implemented by using software, all or some of the embodiments may be implemented in a form of a computer program product. The computer program product includes one or more computer program instructions. When the computer program instructions are loaded and executed on a computer, the procedures or functions according to the embodiments of this application are all or partially generated. The computer may be a general-purpose computer, a dedicated computer, a computer network, or another programmable apparatus. The computer program instructions may be stored in a computer readable storage medium or may be transmitted from a computer readable storage medium to another computer readable storage medium. For example, the computer program instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for reporting port information, comprising:
    determining, by a terminal device, an uplink signal, wherein:
    the uplink signal comprises at least one of information about a phase tracking reference signal (PTRS) port of the terminal device, information about the PTRS port and information about a demodulation reference signal (DMRS) port, or a correspondence between the PTRS port and the DMRS port; and
    sending, by the terminal device, the uplink signal to a network device,
    wherein the uplink signal comprises the information about the PTRS port of the terminal device, and the information about the PTRS port is a maximum quantity of PTRS ports required by the terminal device.

2. The method according to claim 1, wherein:
    the uplink signal comprises the information about the PTRS port and the information about the DMRS port, the information about the PTRS port is a quantity of PTRS ports, and the information about the DMRS port is a quantity of DMRS ports corresponding to the PTRS port.

3. The method according to claim 2, wherein the correspondence is determined by the network device based on the uplink signal.

4. The method according to claim 2, further comprising:
    sending, by the terminal device, a PTRS to the network device, wherein the PTRS is used by the network device to update the correspondence between the PTRS port and the DMRS port; and
    receiving, by the terminal device, the updated correspondence between the PTRS port and the DMRS port that is sent by the network device.

5. The method according to claim 1, wherein:
    the uplink signal comprises the correspondence between the PTRS port and the DMRS port, and the uplink signal further comprises grouping information of the DMRS port of the terminal device; and
    the correspondence is a correspondence between the PTRS port and a DMRS port group.

6. The method according to claim 5, wherein:
    the grouping information comprises a group number of each DMRS port group and a port number of a DMRS port comprised in each DMRS port group; and
    the correspondence is a correspondence between the PTRS port and the group number of the DMRS port group.

7. A method for reporting port information, comprising receiving, by a network device, an uplink signal from a terminal device, wherein:
    the uplink signal comprises at least one of information about a phase tracking reference signal (PTRS) port of the terminal device,
    information about the PTRS port and information about a demodulation reference signal (DMRS) port, or
    a correspondence between the PTRS port and the DMRS port,
    wherein the uplink signal comprises the information about the PTRS port of the terminal device, and the information about the PTRS port is a maximum quantity of PTRS ports required by the terminal device.

8. The method according to claim 7, wherein:
    the uplink signal comprises the information about the PTRS port and the information about the DMRS port, the information about the PTRS port is a quantity of PTRS ports, and the information about the DMRS port corresponding to the PTRS port is a quantity of DMRS ports corresponding to the PTRS port.

9. The method according to claim 8, further comprising:
    determining, by the network device, the correspondence between the PTRS port and the DMRS port based on the uplink signal; and.

10. The method according to claim 8, further comprising:
    receiving, by the network device, a PTRS sent by the terminal device;
    updating, by the network device, the correspondence between the PTRS port and the DMRS port based on the PTRS; and
    sending, by the network device, the updated correspondence between the PTRS port and the DMRS port to the terminal device.

11. The method according to claim 7, wherein:
the uplink signal comprises the correspondence between the PTRS port and the DMRS port, and the uplink signal further comprises grouping information of the DMRS port of the terminal device; and
the correspondence is a correspondence between the PTRS port and a DMRS port group.

12. The method according to claim 11, wherein:
the grouping information comprises a group number of each DMRS port group and a port number of a DMRS port comprised in each DMRS port group; and
the correspondence is a correspondence between the PTRS port and the group number of the DMRS port group.

13. A terminal device, comprising:
a processor configured to determine an uplink signal, wherein:
the uplink signal comprises at least one of information about a phase tracking reference signal (PTRS) port of the terminal device, information about the PTRS port and information about a demodulation reference signal (DMRS) port, or a correspondence between the PTRS port and the DMRS port; and
a transmitter configured to send the uplink signal to a network device,
wherein the uplink signal comprises the information about the PTRS port of the terminal device, and the information about the PTRS port is a maximum quantity of PTRS ports required by the terminal device.

14. The terminal device according to claim 13, wherein:
the uplink signal comprises the information about the PTRS port and the information about the DMRS port, the information about the PTRS port is a quantity of PTRS ports, and the information about the DMRS port is a quantity of DMRS ports corresponding to the PTRS port.

15. The terminal device according to claim 13, wherein:
the uplink signal comprises the correspondence between the PTRS port and the DMRS port, and the uplink signal further comprises grouping information of the DMRS port of the terminal device; and
the correspondence is a correspondence between the PTRS port and a DMRS port group.

16. The terminal device according to claim 15, wherein:
the grouping information comprises a group number of each DMRS port group and a port number of a DMRS port comprised in each DMRS port group; and
the correspondence is a correspondence between the PTRS port and the group number of the DMRS port group.

17. A network device comprising a receiver configured to receive an uplink signal from a terminal device, wherein:
the uplink signal comprises at least one of information about a phase tracking reference signal (PTRS) port of the terminal device, information about the PTRS port and information about a demodulation reference signal (DMRS) port, or a correspondence between the PTRS port and the DMRS port,
wherein the uplink signal comprises the information about the PTRS port of the terminal device, and the information about the PTRS port is a maximum quantity of PTRS ports required by the terminal device.

18. The network device according to claim 17, wherein:
the uplink signal comprises the information about the PTRS port and the information about the DMRS port, the information about the PTRS port is a quantity of PTRS ports, and the information about the DMRS port corresponding to the PTRS port is a quantity of DMRS ports corresponding to the PTRS port.

19. The network device according to claim 17, wherein:
the uplink signal comprises the correspondence between the PTRS port and the DMRS port, and the uplink signal further comprises grouping information of the DMRS port of the terminal device; and
the correspondence is a correspondence between the PTRS port and a DMRS port group.

20. The network device according to claim 19, wherein:
the grouping information comprises a group number of each DMRS port group and a port number of a DMRS port comprised in each DMRS port group; and
the correspondence is a correspondence between the PTRS port and the group number of the DMRS port group.

* * * * *